United States Patent

[11] 3,602,588

| [72] | Inventors | Dean M. Peterson<br>Littleton, Colo.;<br>Cornelis T. Veenendaal, Milwaukie, Oreg. |
|---|---|---|
| [21] | Appl. No. | 869,667 |
| [22] | Filed | Oct. 27, 1969 |
| [45] | Patented | Aug. 31, 1971 |
| [73] | Assignee | Honeywell, Inc.<br>Minneapolis, Minn. |

[54] UNITARY REVERSIBLE DUAL SLIDE INDEXING MECHANISM FOR AN AUTO CUE AND PREVIEW SLIDE PROJECTOR
10 Claims, 13 Drawing Figs.

[52] U.S. Cl. .................................................. 353/118, 353/21
[51] Int. Cl. ................................................ G03b 23/04
[50] Field of Search .......................................... 353/103, 114, 116, 118, 106, 21

[56] References Cited
UNITED STATES PATENTS

| 2,984,151 | 5/1961 | Halahan et al. | 353/118 X |
| 3,121,368 | 2/1964 | Hall | 353/118 |
| 3,336,836 | 8/1967 | Gould et al. | 353/21 |

*Primary Examiner*—Harry N. Haroian
*Attorneys*—Arthur H. Swanson, Lockwood D. Burton and John Shaw Stevenson

ABSTRACT: A two-position control lever adjusted mechanism for either advancing or reversing in a sequential one or two-tooth manner the direction an indexing pinion drives the teeth on a rack of a photographic projector tray in its respective forward and reverse direction. This construction allows each consecutive slide to be previewed and then shown on a screen or, alternatively, every other slide to be shown on the screen while each one of the remaining slides are consecutively moved into a preview position where they will provide descriptive data or cues for a narrator to see and/or read for each slide when it is projected on the screen.

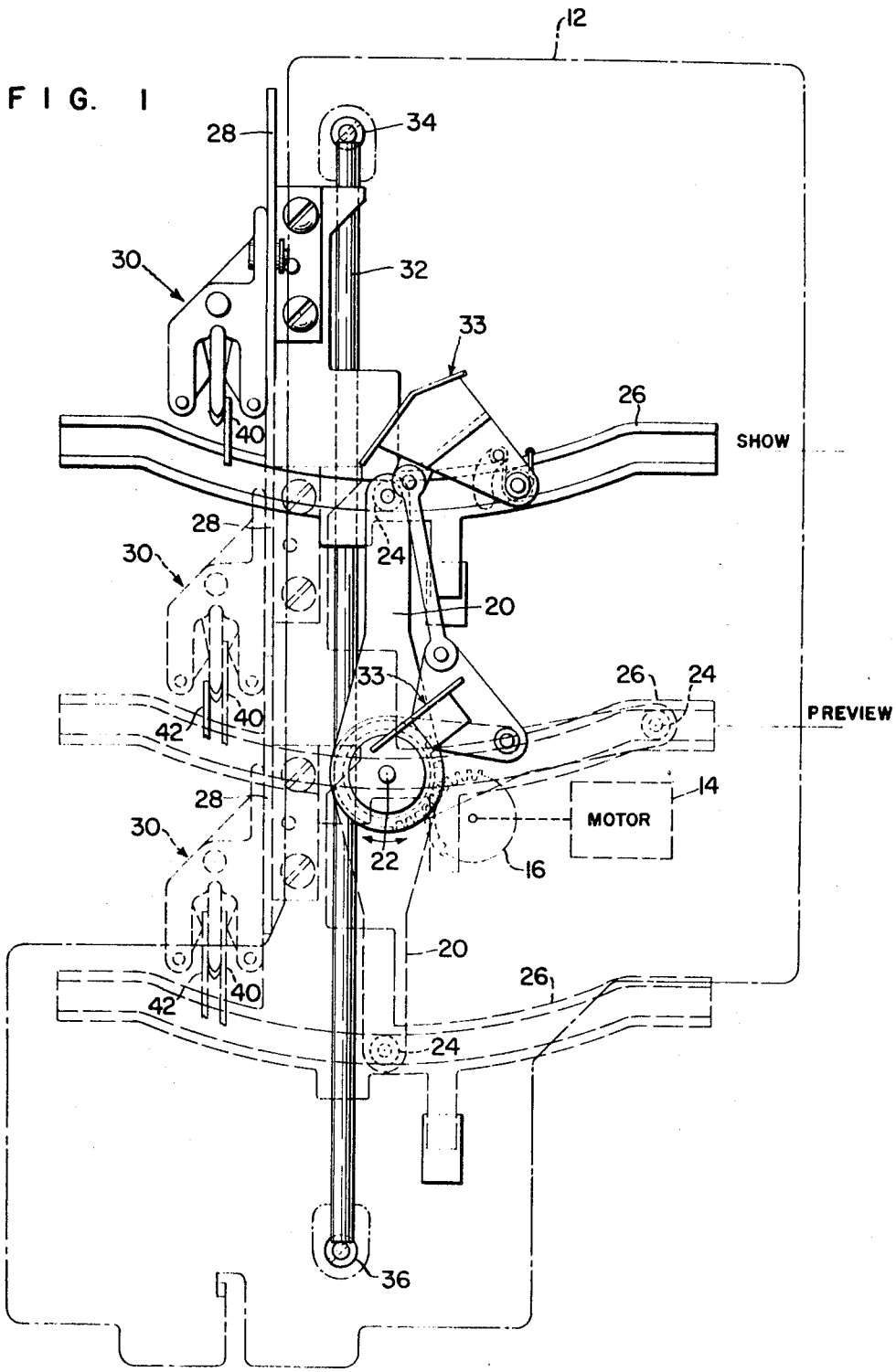

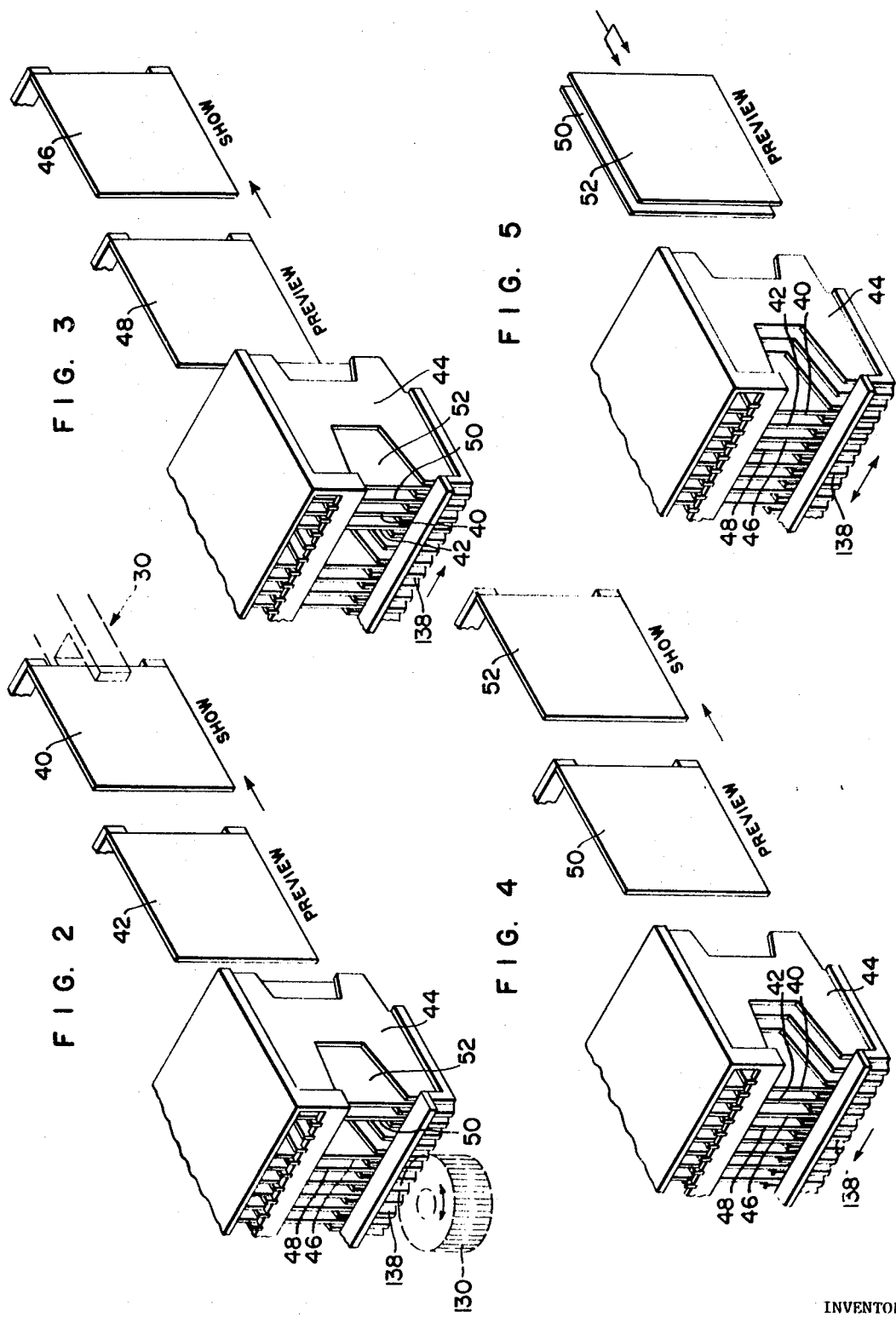

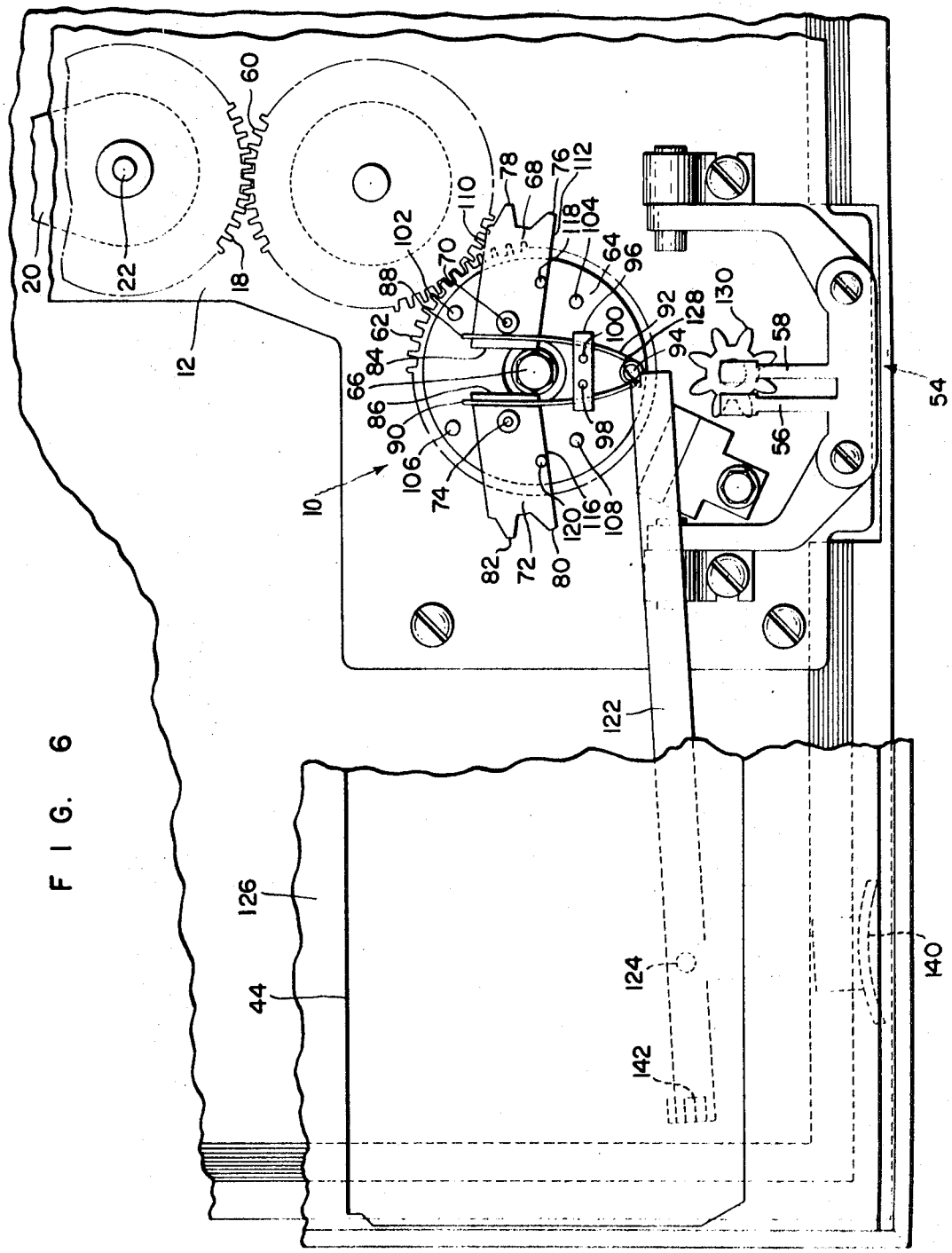
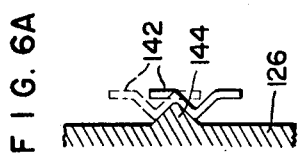

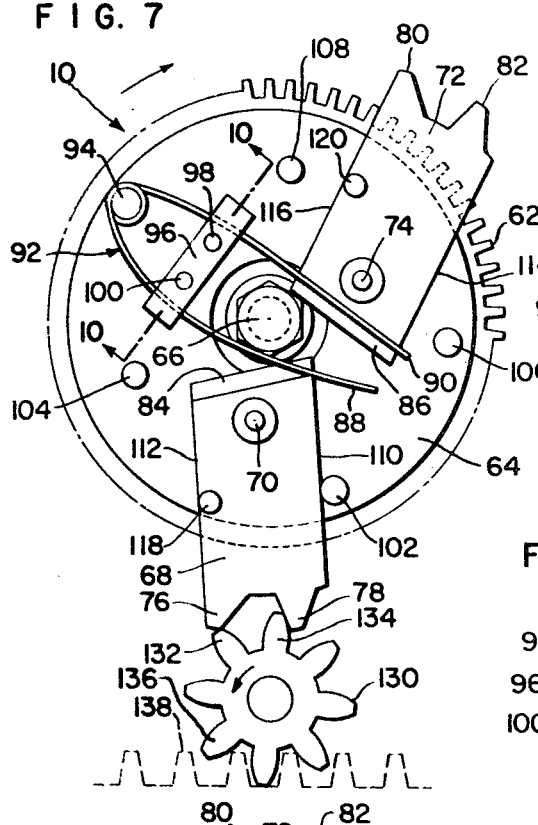
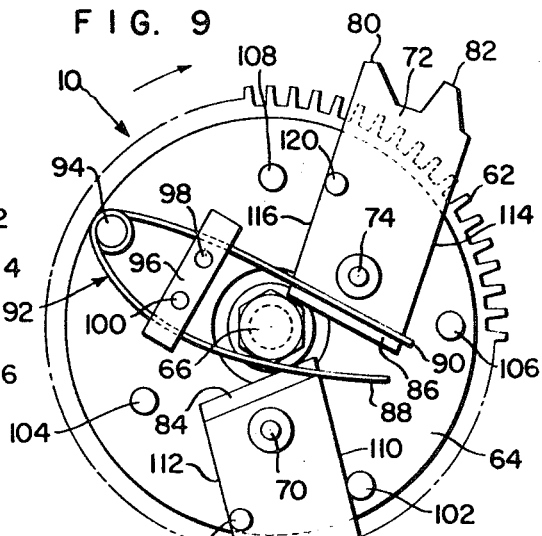
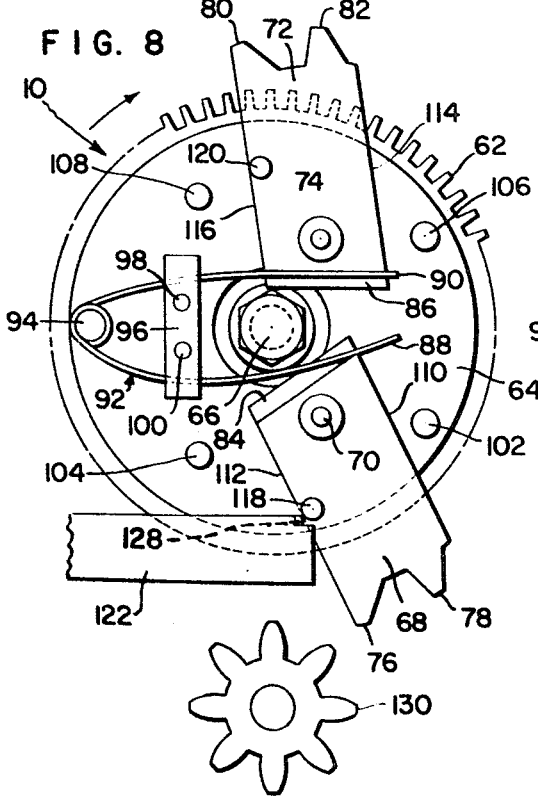
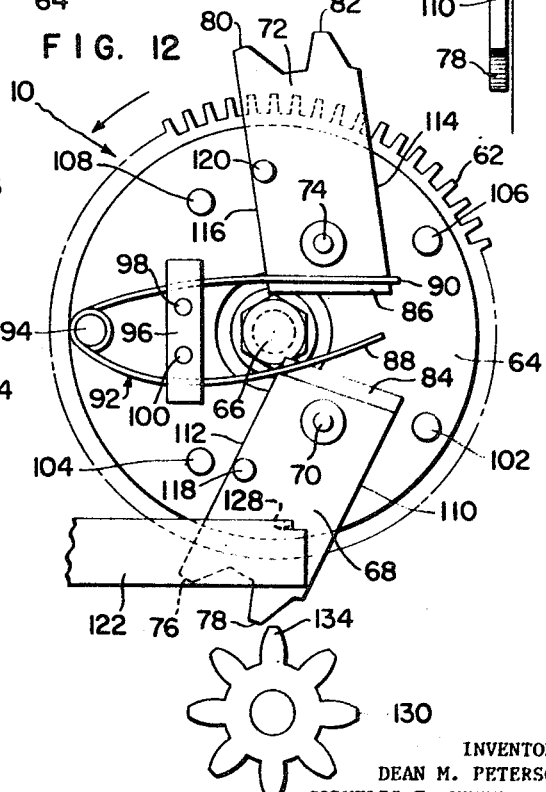

UNITARY REVERSIBLE DUAL SLIDE INDEXING MECHANISM FOR AN AUTO CUE AND PREVIEW SLIDE PROJECTOR

It is an object of the present invention to provide a two position control lever adjusted mechanism for a preview type slide projector which when placed in a first position will enable a first pair of adjacent slides in a slide tray to be jointly moved in a sequential manner from the tray into respective show and preview positions and thence jointly back into the tray, the tray to be advanced one septum and the second and third slides to be moved into the show and preview position.

It is another object of the present invention to provide a two position lever actuated mechanism of the aforementioned type which can be placed in a second position to enable auto cue action to take place wherein the first slide can be shown on a screen while the second slide in the preview position acts as a cue for the first slide, the first and second slides can be returned to the tray, the tray advanced two septums so that a third slide is moved into the show position and projected onto the screen while the fourth slide is moved to the preview position to act as a cue for the third slide etc.

It is still another object of the present invention to provide a mechanism of the aforementioned type that will continue to move other succeeding pairs of slides from the tray into their respective show and preview position as the tray continues to be moved in a forward direction and which will perform a similar but reverse action to those just described when the tray is driven in a reverse direction.

A better understanding of the present invention may be had from the following detailed description when read in connection with the accompanying drawings in which:

FIG. 1 is a view showing how a scotch yoke having a crank arm pin driven curved channel is employed to move a pair of slide pulling jaws and the two slides in a straight line between their preview and show positions;

FIG. 2 shows the preview and show position into which the slides are positioned by the slide pulling jaws shown in FIG. 1;

FIG. 3 shows a second position of the tray after the tray has been moved two septums in a forward direction from the position shown in FIG. 2 by the unique indexing mechanism and other slides different from those shown in FIG. 2, have been moved into their preview and show positions;

FIG. 4 shows a third position of the tray after the tray has been moved two septums in a reverse direction from the position shown in FIG. 2 by the unique indexing mechanism and two other slides, different from those shown in FIG. 2 or 3, have been moved into their preview show positions;

FIG. 5 shows how the slides shown for example in FIG. 4 are returned jointly to the tray by the slide moving apparatus of FIG. 1;

FIG. 6 shows the unique lever and dual tooth arm indexing mechanism on a pallet, in its neutral inactive position, that is employed to move the tray indexing pinion shown in FIG. 2 either one or two teeth during any one slide tray indexing operation;

FIG. 6A is a view showing a rib and spring connection to retain the control lever of FIG. 6 in an active and inactive position.

FIG. 7 shows the indexing mechanism in a position in which a leading tooth on one of its pivot arms has been moved in a nondriving relation past the tray indexing pinion and its trailing tooth is starting to engage and advance the tray indexing pinion one tooth unit in a counterclockwise direction and in a direction to advance the tray one septum in a forward direction;

FIG. 8 shows that the lever has been moved from its inactive solid line position shown in FIG. 6 to a position in which a protrusion thereon is moving a drive pin, and a dual tooth segment to which the pin is attached toward a stop on a pallet so that the pivot arm will be placed in a position where both its leading and trailing teeth can be engaged with a tooth on the tray indexing pinion;

FIG. 9 shows the beginning of the dual tooth engagement of the pivot arm referred to in the description of FIG. 8 and after the protrusion on the lever has slid off the drive pin that is carried by the pivot arm;

FIG. 10 shows a sectional view of the spring and the support thereof in a position shown for example in FIG. 9;

FIG. 11 is a right end view of the pivot arm and a spring associated therewith as well as the driving pin that protrudes therefrom with which the protrusion on the lever shown in FIG. 8 is engaged and;

FIG. 12 shows the pallet and pivot arms thereon being driven in a reverse direction to that just described for FIGS. 7, 8, and 9, and how the protrusion on the lever is positioned similarly to FIG. 8 to engage a drive pin on another of the two pivot arms after the top pallet portion on which this arm is mounted has been rotated counterclockwise from the position shown in FIG. 12.

The unique tray indexing apparatus 10 can be beneficially employed for use in many types of preview type slide projectors particularly for example in a slide projector having a mechanism to push, grip, kick, and change slides as is disclosed in the Stephen Blecher et al. application, Ser. No. 759,608.

FIG. 1 shows a mechanism plate 12, a reversible motor 14 mounted thereon that is connected by a gear reduction unit 16 to a gear 18 and crank arm 20 to drive these elements in a clockwise or counterclockwise direction about stub shaft 22 that in turn is fixedly mounted on the mechanism plate 12.

A drive pin 24 is connected to one end of the crank arm 20 to engage the crank slider 26. A cross plate 28 is fixed to the slider 26 and the slide gripping mechanism 30 is fixedly connected for movement with the crank slider 26 that in turn is mounted for movement along the stationary rod 32 which is retained at its end by suitable screw connections 34, 36, to mechanism plate 12.

The slide moving mechanism just described and the shutter mechanism 33 is similar to that disclosed in the previously mentioned Stephen Blecher et al. patent application Ser. No. 759,608, except that the central portion of the slider 26 is constructed of a substantially arcuate shaped configuration in lieu of a straight line channel construction.

The purpose of this arcuate construction is to allow more time for the indexing mechanism to move the tray through a distance that will allow two different adjacent pair of slides in the tray to be moved during each indexing operation into a position where they may be transported into their respective show and preview positions before such dual slide movement takes place. This arcuate construction also enables the motion of the crank arm 20 and its associated pin 24 to speed up the time it initially takes during the start of the movement that the crank slider is required to make in returning the slides for example 40, 42, to the tray 44 as shown in FIGS. 1 and 2 so that the additional cycle time required to index the slides will be nullified.

More specifically, it can thus be seen from the aforementioned description that the speeding up action will enable the loss in time, that was needed to move the tray 44 two slide units in a forward and reverse manner to be cancelled and the time to make a complete slide changing cycle to remain the same as that set forth in the Stephen Blecher et al. patent application, Ser. No. 759,608.

The manner in which the unique dual indexing mechanism 10 shown in FIGS. 6–12 provides a way of allowing two different slides 42, 40 to be first removed from the tray 44 so they can be placed in their preview and show position as shown in FIG. 2 back into the tray and after the tray is moved forward two septums from the FIG. 2 position to then allow the next two different slides 46, 48, to be moved into their respective show and preview positions as shown in FIG. 3.

Alternatively it can also be seen from FIG. 4 that the tray 44 can be moved from FIG. 2 position two septums in a reverse manner so that the first two slides 50, 52 in the tray 44 can be placed in their respective preview and show positions and returned to the tray 44 in the manner shown in FIG. 5.

FIG. 6 shows the rotatable type of pusher mechanism 54 having slide engaging pushing arms 56, 58, employed in the Stephen Blecher et al. patent application, Ser. No. 759,608, to push two slides at a time from the tray into the slide gripping mechanism 30 shown in FIG. 1.

FIG. 6 shows a gear 60 positioned in driving relation between the crank arm driving gear 18 and a gear 62 whose front face forms a pallet 64. The gear 62 is mounted for rotation in either a clockwise direction or a counterclockwise direction about a suitable stub shaft 66 that has its lower end fixed to the mechanism plate 12.

The pallet 64 supports a first arm 68 that is rotatably mounted thereon by means of a first pin shaft 70. The pallet 64 also supports a second arm 72 that is rotatably mounted thereon by means of a second pivot pin 74.

Each of the arms 68, 72 have associated pairs of teeth 76, 78; 80, 82 at their respective outermost ends. Each arm 68, 72 has an associated L-shaped wall portion 84, 86, forming a recess therein to accommodate the insertion of associated leg portions 88, 90 of a tooth spring 92 therein to maintain their respective first and second toothed arms 68, 72 in a neutral position as shown in FIGS. 6 and 11.

The central portion of the tooth spring 92 is fixedly mounted by means of a pin 94 on pallet 64. The leg portions 88, 90 of the spring 92 are retained against movement away from the upper surface of the pallet 64 by means of T-shaped member 96 that is retained in the pallet 64 by means of rivets 98, 100.

Pair of cylindrically shaped protuberances 102, 104, 106, 108 are shown fixedly connected to and protruding outwardly from the flat side of the pallet 64 to the upper flat surface level of the arms 68, 72 in order to form arm stops.

Each pair of stops 102, 104; 106, 108 therefore provide a means against which the opposite side edges 110, 112, 114, 116 of the arms 68, 72 can be engaged and stopped when they are rotated through an arc in either a clockwise ro counterclockwise direction.

A first cylindrical pin 118 that is fixedly attached to and which protrudes upwardly from the pivoted tooth arm 68 is shown in FIGS. 6 and 11 and a second pin 120 similar to the first pin 118, is shown fixedly attached to and protruding upwardly from the pivoted tooth arm 72 as shown for example in FIG. 6.

A substantially T-shaped control lever 122 is shown in FIG. 6 mounted for rotation on a stub shaft 124 which in turn is fixedly supported on and protrudes downwardly from the underside surface of the tray support plate 126.

When the T-shaped control lever 122 is in a position that is above the flat surface of the arms 68, 72, as shown in FIG. 6, a protrusion 128 thereon formed by a bent-down right corner portion will remain out-of-contact with each of the respective drive pins 118, or 120 associated with the arms 68, 72 as the pallet 64 is rotated in either a clockwise or counterclockwise direction by motor 14 and its associated gear reduction drive 16.

While the control lever 122 is in this out of arm contact position and the index pinion actuating arm 68 has been rotated from the position shown in FIG. 6 toward the position shown in FIG. 7 it can be seen that the centrifugal force will cause arm 68 to rotate counterclockwise about its pivot and in an opposite direction to the clockwise direction in which the pallet 64 is being rotated by the motor 14 and gear reduction unit 16.

While the aforementioned counterclockwise swing movement of the arm 68 takes place the teeth 76, 78 on the end of the arm 68 will be gradually moved out at a greater distance from the axis of the rotation of the pallet 64 toward the teeth of the slide tray indexing pinion 130 as the right edge 110 approaches the stop 102 on the pallet. Before the right edge hits the stop as shown in FIG. 7 it can be seen that the leading tooth 76 will have moved passed for example the teeth 132, 134 of the tray indexing pinion 130 without having any driving contact occurring between the tooth 76 and the teeth 132 or 134 of the tray index pinion 130.

When the centrifugal force inherent in arm 68 due to the rotation of the pallet 64 has moved the edge of the arm 68 against the stop 102 the upper end of the arm 60 will have been moved to a position in which its L-shaped wall portion 84 is compressing leg 88 of spring 92. When in this latter mentioned position the tailing tooth 78 on the lower end of the arm 68 will have been moved into the position shown in FIG. 7 and further rotation of the pallet 64 will cause tooth 78 to engage the tooth 134 and thereby effect the rotation of the slide indexing pinion 130 a single tooth in a counterclockwise direction. While this action takes place another tooth 136 on the pinion 130 will engage the gear tooth rack 138 of the tray 44 and cause the tray 44 to be advanced one septum length in a forward left to right direction as shown in FIG. 3.

After the teeth 76, 78, have passed the teeth on the pinion 130 the energy stored in the bent leg 88 of tooth spring 92 will return the arm 68 to its neutral position as shown in FIG. 6.

The thumb actuated portion 140 of the T-shaped control lever 122, shown in FIG. 6, can be engaged and moved with the lever 122 clockwise about shaft 124 to place it in a second position wherein the triangular shaped spring 142 on its left end is moved from its solid line position over a triangular shaped rib 144 on the tray support plate 126 to its dash line position as shown in FIG. 6A.

When the control lever 122 is in the last mentioned position and as shown in FIG. 8 the protrusion 128 on the lever 122 will have been brought into engagement with the pin 118 on the pinion actuating arm 68 to push the arm toward the stop 102 so that its right edge 110 will engage the stop 102 in a shorter period of time than could be attained without this lever actuation as was the case in the previously described lever positioning operation previously set forth under the description of FIG. 1.

While the stationary protrusion 128 on the control lever 122 continues to move the pin 118 and its associated arm 68 from the position shown in FIG. 8 to a position where the arm 68 engages the stop 102 the radial distance between the center of the pallet 64 and the pin 118 will gradually increase and the protrusion 128 will slip off of the pin 118 and out of driving engagement with same just before the arm 68 reaches its engaged position with the stop 102 as shown in FIG. 9.

This action will enable the leading tooth 76 of the arm 68 shown in FIG. 9 to be positioned at a sufficient radial distance from the center of the pallet 64 so that tooth 76 will engage tooth 132 to move the pinion 130 one tooth length in a clockwise direction. Immediately thereafter tooth 78 will be engaged with the tooth 134 to drive the pinion an additional tooth length in a clockwise direction. The aforementioned dual tooth driving action will in turn allow the pinion 130 to advance the rack 138 two septum lengths in a forward left to right direction rather than in a one septum length under the condition set for the under the condition set forth under the description of FIG. 7.

It can be seen that while the pallet 64 is rotated in a clockwise motion shown in FIGS. 7, 8, and 9, that the teeth 80, 82, on the other arm 72 will be allowed to slip passed the teeth of the pinion 130 without any driving action occurring between these parts. This nondriving tooth slipping action occurs because the arm 72 on which the teeth 80, 82, are formed remains out-of-contact with its drive pin 106. This condition exists because the centrifugal force inherent in the arm 74 due to the rotation of pallet 64 causes the arm 72 to be moved about shaft 70 away from its associated driving stop 106 and the resulting radial distance between the center of the pallet 64 of the teeth 80, 82 of the arm 72 to be reduced or in other words moved in a direction away from the top of the teeth of the index pinion 130.

REVERSE INDEXING OF SLIDE TRAY

When the motor 14 is reversed the pallet 64 will be driven in the counterclockwise direction shown in FIG. 12. As this rotation occurs a centrifugal force will be inherent in the arm 68 that will move it in a clockwise direction about the shaft 70 away from its driving pin 102 against the bias of the leg 90 of spring 92 and in a direction away from the teeth on the index pinion 130.

It can be seen that while the aforementioned action occurs the distance between the teeth 76, 78, on arm 68 and the center of the pallet 64 will be diminished and this will cause the teeth 78, 76 on the arm 68 to slip past the teeth of the pinion 130 without any tray indexing pinion driving action occurring.

The other arm 72 will be rotated in a counterclockwise direction from the position shown in FIG. 7 through a position in which the protrusion 128 on the control lever 122 momentarily contacts the drive pin 120 of the arm 72 and during the time in which the radial distance between the center of the pallet 64 and the outermost portion of the teeth 80, 82, is increasing.

After the pin 120 hits protrusion 128 the pin will continue to be moved in an arc-shaped manner outward by its inherent centrifugal force to a position that is out-of-contact with the protrusion and thence contact will take place along arm edge 114 with stop pin 106. When the edge 114 of the arm 72 hits the stop pin 106 it will have been prepositioned by the protrusion 128 on the lever 122 into a position in which the teeth 80, 82 will successively contact and advance the indexing pinion 130 two-tooth units in a counterclockwise direction. Since the indexing pinion 130 is also in contact with the rack 138 the rack will similarly be moved two septum lengths in a reverse right to left direction as shown in FIG. 4.

If the T-shaped control lever 122 is positioned in the solid line position shown in FIG. 6 in which its protrusion 128 remains out-of-contact with the drive pin 120 on arm 72 as the rotation of the pallet 64 causes it to be arcuately rotated thereon the am 72 will under this lever position be moved at a much slower rate toward the stop 106 than the previously described movement it incurs when the pin 120 was brought into contact with the protrusion 128 on the lever 122. This slower motion of the arm 72 thus prevents the outer circumferential surface of the tooth 80 from being moved far enough away from the center of the pallet 64 where driving contact could be made by the tooth 80 with tooth 134 shown in FIG. 12.

The first tooth 80 on the arm 72 will thus slip in a counterclockwise direction by the tooth 134 of the index pinion shown in FIG. 12 without being brought into driving contact therewith. The aforementioned centrifugal force inherent in arm 72 will however cause the remaining tooth 82 to be moved far enough away from the center of the pallet 64 and into contact with the driving stop 106 so that driving contact can be made with the tooth 134 of the index pinion 130 to advance it one tooth length in a counterclockwise direction. Under this FIG. 12 index pinion condition the gear rack 138 will thus be advanced one septum in a reverse or right to left direction or in an opposite direction to that set forth under the description of FIG. 7.

The embodiments of the invention in which an exclusive property or privilege is claimed are defined as follows:

1. An indexing apparatus for a slide tray, comprising a first rotatable member, a means for driving the member in a first direction, an indexing pinion spaced from the first rotatable member and in driving relation with a slide tray, a protuberance protruding from the first rotatable member, an arm having two teeth protruding therefrom, said arm being pivotably mounted on the first rotatable member, an actuating means associated with said arm to effect pivotal movement of the arm on said rotatable member against said protuberance to thereby position its two teeth in a position for driving engagement with associated teeth on the indexing pinion during each rotation of the first rotatable member and to thereby simultaneously effect a two septum tray advance.

2. The slide tray indexing apparatus defined in claim 1 wherein a drive pin is mounted on the arm and the actuating means is a lever having a protrusion thereon to initially contact and drive the pin and arm as a unit toward the protrusion and wherein outward total movement of the arm is effective in causing the driving pin to slip out of driving contact with the protrusion immediately before the arm is brought into contact therewith.

3. The slide tray indexing apparatus defined in claim 1 wherein the actuating means is operably connected for movement under a second condition about a pivot member to another position wherein the protrusion protruding therefrom remains out-of-contact with said arm and wherein the centrifugal force created by the rotation of the first rotatable member on which the arm is pivotedly effective in simultaneously moving the arm in a direction toward the protuberance while the leading tooth on the arm slips over in a nondriving relation with the teeth on the pinion and wherein the arm contacts the protuberance and the trailing tooth thereon is effective to move the trailing booth into a position for driving engagement with a single tooth on the indexing pinion during each rotation of the first rotatable member and to thereby simultaneously effect a single septum tray advance.

4. The tray indexing apparatus defined in claim 1, wherein the means associated with the first rotatable member drives it in a second direction that is opposite to the first direction, a second protuberance protrudes from the first rotatable member, another second member is pivotedly mounted on the first rotatable member that has two teeth on its outer peripheral portion, the actuating means is operably connected for simultaneous pivotal movement of the second arm against said second protuberance and the two teeth of the second arm into a position for driving engagement with associated teeth on the indexing pinion during each of said opposite rotations of the first rotatable member to thereby effect a two septum reversal of the tray.

5. The tray indexing apparatus defined in claim 1 wherein a biasing means is mounted on the first rotatable member and in contact with the arm to return the arm to a neutral out of driving position with the pinion after the teeth on the arm are disengaged from the teeth of the pinion during each rotation of the first rotatable member.

6. The tray indexing apparatus as defined in claim 1 wherein the driving means is further operably connected to a pusher arm to move successive pair of slides in a series of slides in the tray jointly out of the tray into a slide transferring mechanism that has a crank arm driving cam shaped slider and jointly into preview and show positions and thence back into the tray before the tray is moved by the indexing mechanism and thence back into the tray before the tray is moved by the indexing mechanism position. Each successive pair of slides jointly into a show and a preview position.

7. The tray indexing apparatus defined in claim 1 wherein the means of driving said first rotatable member is also employed to drive a dual slide transferring mechanism in sequence with the indexing apparatus to move two different consecutive pair of slides at a time out of the tray into respective slide cueing and slides showing position back into the tray between each successive dual tray indexing apparatus.

8. The tray indexing apparatus as defined in claim 1 wherein the rotatable member is a pallet, the actuating means is a pivoted lever operably connected for moving from said aforementioned position to a second position in which it remains out-of-contact with the arm and allows the centrifugal force acting on the arm due to the rotation of the pallet to position the trailing tooth on the arm against the protuberance and thereby rotate the pinion one tooth length after its leading tooth has slid over the index pinion.

9. The apparatus as defined in claim 1 wherein the drive pin is mounted on the arm and the actuating means is a lever having a protrusion thereon to initially contact and drive the pin and arm as a unit toward the protrusion and wherein outward total movement of the arm is effective in causing the driving pin to slip out of driving contact with the protrusion immediately before the arm is brought into contact therewith and wherein the lever is restricted from movement by a V-shaped spring connected thereto and that is positioned against one side of a stationary triangular-shaped member and wherein the lever is movable to a second position in which the V-shaped spring is moved over the stationary member and into spring contact with another side of said V-member.

10. The tray indexing apparatus as defined in claim 1 wherein the driving means is further operably connected to a pusher arm to move successive pair of slides in a series of slides in the tray jointly out of the tray into a slide transferring mechanism that has a crank arm driving cam-shaped slider and jointly into preview and show positions and thence back into the tray before the tray is moved by the indexing mechanism and thence back into the tray before the tray is moved by the indexing mechanism position, each successive pair of slides jointly into a show and preview position and wherein the cam-shaped slider has an arcuate portion of substantially equal radius to maintain the slide transferring mechanism in a substantially fixed position during said dual slide indexing of the tray and to provide a different curved surface at another portion of the cam to speed up the time it requires the crank arm to complete the extreme end of the crank arm stroke after the slides have been moved to their preview and show positions and before a return of these slides to the tray has occurred.